April 18, 1950   A. F. ERICKSON   2,504,509

METHOD OF REPAIRING DAMAGED SHEET METAL

Filed Oct. 10, 1947

INVENTOR.
ANTON F. ERICKSON
BY
his attorneys

Patented Apr. 18, 1950

2,504,509

UNITED STATES PATENT OFFICE 2,504,509

METHOD OF REPAIRING DAMAGED SHEET METAL

Anton F. Erickson, Dayton, Ohio, assignor to General Motors Corporation, Detroit, Mich., a corporation of Delaware Application October 10, 1947, Serial No. 779,170

2 Claims. (Cl. 113—112)

This invention relates to a method of patching or repairing metal and is particularly directed to a method of repairing damaged sheet metal surfaces and the like.

It is therefore a primary object of the invention to provide a method for repairing damaged sheet metal surfaces wherein a soft, readily conformable, highly porous sheet of metal is used as a patch and which may be placed over an indentation or hole in sheet metal or the like and which may be readily conformed to the irregular surface thereof whereby the patch metal may be heated with a torch and fluxed and the solder be applied thereto, which solder is drawn by capillary action to the juxtaposed surfaces of the patch and the sheet metal and which is held in position by the capillary action within the porous metal. The patch surface may then be feather-edged and finally finished with paint or other finishing material. In the use of porous metal, the pores thereof are completely filled with solder during the soldering operation which stiffens the metal and prevents bending thereof.

Further objects and advantages of the present invention will be apparent from the following description, reference being had to the accompanying drawings, wherein preferred forms of embodiments of the present invention are clearly shown.

Figures 1, 2, 3, 4:
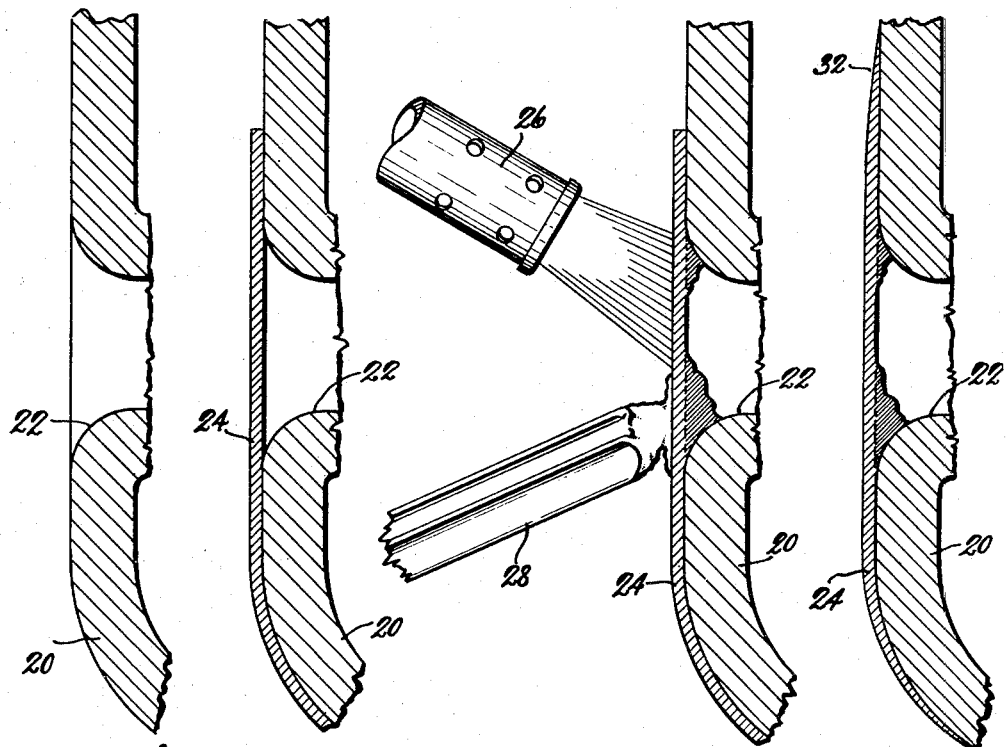
Fig. 1 is a fragmentary enlarged view of a piece of sheet metal having an irregularly shaped hole therein.
Fig. 2 shows the second step of the process wherein a sheet of porous metal has been conformed to shape over the hole.
Fig. 3 shows diagrammatically a blow torch heating the porous metal and the sheet metal with the solder being applied thereto.
Fig. 4 shows the finished patch wherein the edges of the porous metal having been feathered into the sheet metal.

In the patching of sheet metal surfaces which have been damaged, such as damaged automobile bodies and the like, it is always difficult to repair vertical surfaces. This may be explained by the fact that solder, normally used to fill dents and holes, is difficult to hold in position on a vertical surface and runs away from the repair. Expert repairmen generally overcome this difficulty by using the solder in a semi-plastic form. In this condition however, a good bond between the solder and sheet metal is often difficult to obtain. Also when the sheet metal is rusted through in spots, it is extremely difficult to repair over the rusted surface without cutting away all of the rust so that a good bond may be obtained between the solder and the sheet metal.

The use of patches of sheet metal on dents, rusted-out portions and holes is also difficult since it is practically impossible to conform sheet metal to the shape of metal thereunder without the use of a die. For example, if the general shape of the surface to be patched is spherical, it is practically impossible to get the patch to the desired shape. Similarly it is a very difficult task to solder these patches onto the surface of the sheet metal with the result that in automobile body-work, most of the patches are welded in place necessitating the removal of upholstery and the like on the inside of the car to provide access to the body.

The present invention eliminates all of the past difficulties while simultaneously supplying a very satisfactory patch or repair.

The patching material is highly porous metal made by sintering together loose substantially non-compacted metal powder. Manufacture of sheets of this material is clearly described in Davis Patent No. 2,157,596 and in the Olt Patent No. 2,273,589. Briefly, the material is made by mixing the component metals such as copper and tin in the desired proportions, for example, 90 parts copper and 10 parts tin if a bronze is desired or by using a pre-alloy constituent rich surface powder as disclosed in the Olt patent. In either case, the powder is spread on a graphite or other non-adhering surface in the desired thickness and is held in place by a gravity after a smooth layer is obtained. The graphite mold surface together with the powder thereon is then placed in a furnace and is heated under non-oxidizing conditions for from 10 to 30 minutes at temperatures varying from 1500 to 1700° F., inversely proportional to the time. During this sintering, the constituent metals, that is, copper and tin, in the present case, alloy together to form a bronze which is highly porous in nature having interconnecting serpentine pores of capillary size extending therethrough. This material has in the past been very useful as a filter. The sheet of material so formed is dead soft and therefore readily conformable to any shape by manual manipulation thereof. In place of bronze, similar sheets of material may be made from copper-nickel mixtures, iron-copper mixtures and, in fact, mixtures of almost any two powders of different melting points, many of which are disclosed in the Olt patent. This particular feature forms no part of the invention here since all that is necessary in the present case is to provide a sheet of readily conformable highly porous metal made from substantially non-compacted and sintered metal powder. These sheets of material may be made in any desired size compatible with the process of manufacture and may be made in thicknesses varying from .010 of an inch upward. For my purpose, that is, in the repairing method disclosed herein, sheets varying from .010 of an inch to .125 of an inch in thickness are the most desirable in accordance with thickness of material required as designated by the type of patch being made.

Referring to the drawings, in Fig. 1, for illustrative purposes only, shows a fragmentary view of a sheet metal body 20 having a hole 22 therethrough. Fig. 2 shows the second step in the patching method wherein the patch 24 of highly porous metal has been shaped to conform to the surface of the body 20 and to fit over the hole 22. In Fig. 3, a blow torch 26 is shown which is used to heat the patch and the body while the patch 24 is held in place by a screwdriver or similar tool. After the patch 24 is sufficiently hot, solder 28 is applied while the blow torch is preferably maintained in position. The capillary nature of the pores of the patch 24 draws the solder into the patch 24 and through the patch into contact with the sheet metal of the body 20. When the pores of the patch 24 are completely filled with solder, the torch may be removed and the patch allowed to cool, whereupon it will be found that the patch is securely attached to the body and overlies the hole 22. In this case the ingress of the solder within the pores of the patch 24 stiffen the same and make it very hard and durable. The edges of the patch 24 as shown at 30 and 32 in Fig. 4, may then be feather-edged into the body. It will be noted that in this instance the patch is in a vertical plane but the solder does not run away due to the capillary action within the pores of the porous metal 24.

In all cases, suitable fluxes may be used such as a liquid flux which may be applied before or after the patch is applied as desired.

Figure 5:
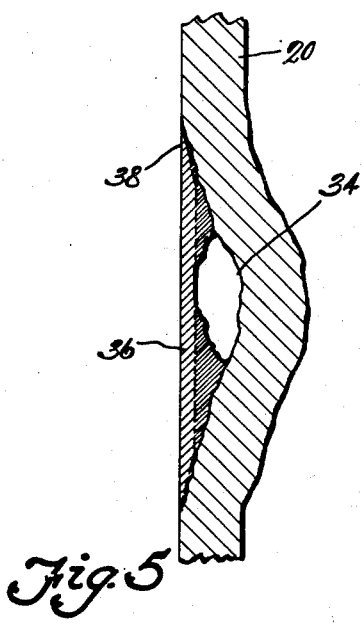
Fig. 5 shows a fragmentary section of another type of repair wherein a sheet metal part has been dented. In this instance, the porous metal is cut to the approximate shape of the dent and is feather-edged so as to fit flush with the surface of the sheet metal.

Another type of repair is shown in Fig. 5 wherein the body 20 has an indentation 34 therein. This indentation is difficult to straighten without removing upholstery and in some cases, is impossible to shrink sufficiently the metal of the body to remove the dent. With the present patching method it is possible without removal of the upholstery to repair the dent from the outside. In this case, a patch 36 is used which is cut to generally conform to the outside shape of the dent. Patch 36 is feather-edged at 38 therearound so as to fit flush with the remainder of the body within the dent. The repair is next fluxed, heated and soldered as before whereupon a satisfactory flush repair is obtained which requires very little additional finishing on the outside.

Figure 6:
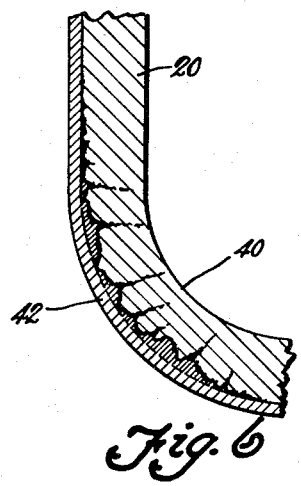
Fig. 6 shows another type of repair wherein a rusted out portion of the sheet metal is covered over and repaired by a piece of porous metal.

Fig. 6 shows still another type of repair which is very useful in connection with the body 20 having rusted out portions 40 thereon. In this case, a porous metal patch 42 is used which conforms with the shape of the body and which is of sufficient extent to reach solid metal on both ends of the repair. The patch is fluxed, heated and soldered as before whereupon the solder will work through the patch and into the interstices of the rusted portion for strengthening the rusted portions and for simultaneously bonding the patch 42 onto the body 20 at the solid portions thereof.

In all cases, the patching is a simple procedure which may be carried out from one side of the body only. The capillary action within the pores of the porous metal permits flow of solder therethrough so that a highly satisfactory coextensive joint may be obtained between the juxtaposed surfaces of the patch and the sheet metal to be repaired. Similarly due to the nature of the patch, the solder will be drawn into place on the vertical surfaces. The method is even satisfactory where the patch must be soldered from below.

It is understood that this patching or repairing method is not only limited to automobile bodies and the like but may be used on any surfaces for example, hot water boilers, cooking utensils and the like and it may be used in connection with materials which are not of a sheet metal variety if sufficient heat can be obtained to get a satisfactory soldered joint. In all cases, the success of the invention resides in the readily conformable condition of the highly porous metal and its ability to absorb and distribute solder therethrough.

While the embodiments of the present invention as herein disclosed, constitute preferred forms, it is to be understood that other forms might be adopted, all coming within the scope of the claims which follow.

What is claimed is as follows:

1. In a method of repairing damaged sheet metal, the steps of; preparing the sheet metal around the damaged portion for soldering, fitting a patch over the damaged portion which consists of a relatively thin, continuous sheet of readily conformable, highly porous metal made from substantially non-compacted sintered metal powder, heating the patch and the sheet metal while simultaneously holding the patch in place, applying solder to the patch when the patch and sheet metal are at temperatures above the melting point of the solder whereby the solder is absorbed within the pores of the patch by capillary action and is distributed throughout the patch and at the juxtaposed surfaces of the patch and the sheet metal for forming a coextensive bond therebetween and for simultaneously destroying the porosity of the porous metal.

2. The method as claimed in claim 1 together with the added step of finishing the soldered portion of the porous metal surface after the solder has hardened to present a smooth, continuous surface.

ANTON F. ERICKSON.

REFERENCES CITED

The following references are of record in the file of this patent:

UNITED STATES PATENTS

| Number | Name | Date |
|---|---|---|
| 1,309,033 | Irwin | July 8, 1919 |
| 1,956,233 | Braun | Apr. 24, 1934 |
| 2,337,322 | Gascoigne | Dec. 21, 1943 |
| 2,401,483 | Hensel | June 4, 1946 |

FOREIGN PATENTS

| Number | Country | Date |
|---|---|---|
| 286,089 | Great Britain | Mar. 1, 1928 |